United States Patent [19]

Smith

[11] Patent Number: 5,085,907
[45] Date of Patent: Feb. 4, 1992

[54] ABRASION-RESISTANT PROTECTIVE LAMINATES

[75] Inventor: Thomas M. Smith, Spencerport, N.Y.

[73] Assignee: Eastman Kodak Company, Rochester, N.Y.

[21] Appl. No.: 577,839

[22] Filed: Sep. 4, 1990

Related U.S. Application Data

[63] Continuation of Ser. No. 210,280, Jun. 23, 1988, abandoned.

[51] Int. Cl.$^5$ .............................. B32B 7/06; C09J 7/02
[52] U.S. Cl. ...................................... 428/40; 428/345; 428/354
[58] Field of Search ................. 428/354, 483, 40, 345; 430/272, 280

[56] References Cited

U.S. PATENT DOCUMENTS

| | | | |
|---|---|---|---|
| 4,077,830 | 7/1978 | Fulwiler | 156/249 |
| 4,329,420 | 5/1982 | Bopp | 430/291 X |
| 4,337,107 | 6/1982 | Eshleman | 156/249 |
| 4,378,392 | 3/1983 | Segel | 428/40 |
| 4,581,267 | 4/1986 | Miller | 428/40 |
| 4,623,676 | 11/1986 | Kistner | 430/280 X |

Primary Examiner—Jenna Davis
Attorney, Agent, or Firm—Alfred P. Lorenzo

[57] ABSTRACT

Multi-layer sheet materials useful as protective laminates for application to substrates, such as photographic elements, which require the protection of an abrasion-resistant material, are comprised of a strippable carrier, an abrasion-resistant layer which overlies the carrier, a structural interlayer which overlies the abrasion-resistant layer, and an adhesive layer which overlies the structural interlayer. The structural interlayer is very thin in relation to the thickness of the carrier, and is permanently bonded to one surface of the abrasion-resistant layer, whereas the carrier is releasably bonded to the other surface of the abrasion-resistant layer so as to permit it to be stripped away after it has served its purpose. A process for manufacturing the multi-layer sheet material comprises the steps of advancing the carrier in web form through a coating station at which it is coated with a layer of liquid composition that is curable to a solid form; laminating the structural interlayer to the coated surface of the carrier; curing the liquid layer in situ to a solid form to thereby form an abrasion-resistant layer; and applying an adhesive layer over the surface of the structural interlayer.

12 Claims, 1 Drawing Sheet

ABRASION-RESISTANT PROTECTIVE LAMINATES

This is a continuation of application Ser. No. 210,280, filed June 23, 1988 now abandoned.

FIELD OF THE INVENTION

This invention relates in general to protective laminates and in particular to multi-layer sheet materials useful as protective laminates for application to substrates requiring protection with an abrasion-resistant material. More specifically, this invention relates to novel multi-layer sheet materials which include a strippable carrier which facilitates application to a substrate of an extremely thin and very smooth abrasion-resistant protective laminate. It also relates to a new and improved method for manufacture of such multi-layer sheet materials.

BACKGROUND OF THE INVENTION

It is well known to employ protective laminates to provide an abrasion-resistant surface on substrates that are subject to abrasion damage. Among the many uses for such protective laminates, one which imposes especially stringent requirements is use in the photographic field. Many photographic products are amenable to significant improvement in their performance through use of such abrasion-resistant laminates, for example, photographic color prints, graphic arts films, X-ray films, motion picture films, microfilms and microfiche. Photosensitive elements known in the art as "phototools" have an acute need for the type of protection against abrasion and scratches that can be provided by a protective laminate, and impose especially demanding constraints. Such elements are used, for example, in the preparation of lithographic printing plates and in the utilization of photoresists in the production of printed circuits. The phototool is composed of a support with a high degree of dimensional stability and one or more layers of a photosensitive material, such as a silver halide emulsion, a photopolymer composition or a diazo composition coated on the support. The photosensitive layer has a relatively soft surface and is thereby subject to scratching, abrasion and other damage in use which severely detracts from its capabilities. Moreover, the optical and mechanical requirements are very stringent, so that a useful protective laminate must provide the desired protection without interfering with the ability of the phototool to meet these exacting requirements.

Many attempts have been made heretofore to produce protective laminates that are useful with substrates needing protection against abrasion, scratches and the like, including phototools and other photographic materials, as well as glass, plastics, metals and many types of fragile coatings. Protective laminates particularly intended for use with phototools are described in Fulwiler, U.S. Pat. No. 4,077,830, issued Mar. 7, 1978; while those particularly intended for use with photographic color prints are described in Segel, U.S. Pat. No. 4,378,392 issued Mar. 29, 1983, and Miller, U.S. Pat. No. 4,581,267, issued Apr. 8, 1986. The protective laminates of Eshleman, U.S. Pat. No. 4,337,107 issued June 29, 1982 are described as being useful in the protection of a very wide range of substrates, including photographic elements and many other materials.

While the protective laminates of the prior art are useful in many applications, they suffer from serious deficiencies which have hindered more widespread commercial application. Thus, for example, they are frequently too thick and thereby subject to causing optical distortion to too great an extent to be successfully employed in the photographic field. Another common problem is their ability to provide a protective surface with as high a degree of resistance to abrasion and scratching as is needed. Yet another concern is the tendency of protective laminates to cause excessive curling of the photographic element to which they are applied. A still further problem is the great difficulty in manufacturing a protective laminate which is extremely thin, and in applying such laminate in a wrinkle-free state, because of the many difficulties that arise in conveying and handling extremely thin web materials.

It is toward the objectives of providing a new and improved protective laminate which overcomes the deficiencies of the prior art, and of providing a commercially practical method for the manufacture of such laminate, that the present invention is directed.

SUMMARY OF THE INVENTION

In accordance with this invention, a multi-layer sheet material is utilized to form an abrasion-resistant protective laminate on the surface of a substrate requiring protection from abrasion. The multi-layer sheet material comprises a strippable carrier comprised of a relatively thick layer of a flexible material, an abrasion-resistant layer which overlies the carrier and is releasably bonded thereto, a very thin structural interlayer formed of flexible material overlying the abrasion-resistant layer, and an adhesive layer overlying the structural interlayer. The structural interlayer is very thin in relation to the thickness of the carrier, and is permanently bonded to one surface of the abrasion-resistant layer, whereas the carrier is only temporarily bonded to the abrasion-resistant layer since it is intended that the carrier be stripped from the remainder of the multi-layer sheet material by the user. In some embodiments of the invention, the multi-layer sheet material also includes a release sheet which covers the adhesive layer so as to permit the sheet material to be wound in roll form without adjacent convolutions of the roll sticking together.

To protect a substrate, such as, for example, a phototool or other photographic element, from abrasion, the adhesive surface of the sheet material is pressed, after removing any release sheet, into conforming contact with the substrate and is bonded thereto. Thereafter, the carrier is stripped away so as to expose the underlying abrasion-resistant layer. By virtue of the excellent abrasion-resistant and scratch-resistant properties of the abrasion-resistant layer, the substrate is provided with a durable protective surface, whereas by virtue of the extreme thinness of the laminate applied, there is no significant adverse effect on optical characteristics or other properties. Since the carrier is strippable, the layers which remain on the substrate are only the adhesive layer, the interlayer and the abrasion-resistant layer and, since each of these can be extremely thin, the overall thickness of the protective laminate is much less than that of many of the prior art laminates.

A simple and efficient method for manufacturing the multi-layer sheet material of this invention comprises the steps of advancing the carrier in web form through a coating station at which it is coated with a layer of liquid composition that is curable to a solid form; laminating the structural interlayer to the coated surface of the carrier using suitable laminating means such as pressure rollers; curing the liquid layer to a solid form to thereby form an abrasion-resistant layer; and applying an adhesive layer over the surface of the structural interlayer. Additional steps may also be employed such as, for example, the steps of securing a release sheet over the exposed surface of the adhesive layer and winding the sheet material into roll form for convenient handling in use. Since the carrier is relatively thick, it is easily conveyed through the coating station where the curable liquid composition is applied; whereas the very thin structural interlayer does not have to be coated with the curable liquid composition, but is merely subjected to a wet laminating step. In this way, the serious difficulties ordinarily encountered in conveying and coating a very thin web without distortion, wrinkling, or damage are effectively avoided, and the manufacturing process is one which is easily and conveniently conducted on a commercial scale.

DETAILED DESCRIPTION OF THE INVENTION

Figure 1:
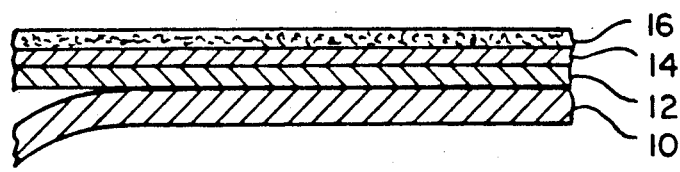
FIG. 1 is a cross-sectional view of a multi-layer sheet material of this invention composed of a strippable carrier, an abrasion-resistant layer, a structural interlayer, and an adhesive layer.

The multi-layer sheet material of this invention is useful in the protection of a wide variety of different substrates and can be manufactured from a wide variety of different materials. The optimum materials and optimum layer thicknesses will depend in part on the end use requirements of the laminate, and the particular materials chosen will in turn require appropriate modification of the manufacturing process. Key features of the multi-layer sheet material include the requirement that the structural interlayer be very thin in relation to the thickness of the carrier, and that the abrasion-resistant layer be permanently bonded to the structural interlayer and releasably bonded to the carrier.

The method of manufacture described herein is also capable of widespread variation, depending on the particular choice of materials and techniques. Key features of the method include the utilization of two coating steps and one wet laminating step—whereby the very thin structural interlayer is incorporated into the multi-layer sheet material by wet lamination and the curable liquid composition and adhesive composition are incorporated by coating processes—and the formation of the abrasion-resistant layer by an in situ curing process.

In the multi-layer sheet material of this invention, the strippable carrier performs several important functions. Thus, for example, it serves as the support on which the curable coating composition is coated. Because it is relatively thick, it is easily transported, so as to facilitate the coating step, and it is able to withstand substantial tension so as to resist curling or other distortion caused by the shrinkage that is normally associated with the curing of a curable coating composition. Because the carrier is very smooth and the curable liquid composition applied thereto will tend to replicate the surface to which it is applied, the resulting abrasion-resistant layer will have the desired high degree of smoothness that provides undistorted optical transmission. The thick carrier provides a multi-layer sheet material that is resistant to wrinkling, distortion or dimensional change during the process of applying the protective laminate to the substrate requiring protection and also provides for ease of stripping after the carrier has served its purpose. Because of its overall thickness, the multi-layer sheet material can be laminated to the substrate using relatively high tension and considerable lamination force. It is very much easier to handle than a very thin laminate that does not include a strippable carrier. Thus, for example, with a very thin laminate that does not include a strippable carrier, the degree of tension used in the laminating step must be very carefully controlled. If there is not enough tension, the result will be formation of wrinkles, whereas excessive tension can cause curling and distortion of an element such as a phototool.

A wide variety of flexible sheet materials are suitable for use as the strippable carrier. Examples of suitable materials include polyesters, polycarbonates, polystyrenes, polyvinyl chloride, acrylonitrile-butadiene-styrene resins, polyolefins such as polyethylene or polypropylene, copolymers of ethylene such as ethylene/vinyl acetate copolymers, copolymers of vinyl chloride such as vinyl chloride/vinyl acetate copolymers, and the like. Particularly preferred materials for the strippable carrier are polyester films and especially polyethylene terephthalate film.

The mean thickness of the flexible sheet material used as the strippable carrier is typically in the range of from about 50 to about 175 micrometers and a particularly preferred material has a mean thickness of about 60 micrometers.

A very important feature of the multi-layer sheet material of this invention is the abrasion-resistant layer that is formed by in situ curing of a liquid coating composition. Useful liquid compositions that are curable to a solid form include heat-curable compositions and radiation-curable compositions that are cured by such means as electron bombardment or exposure to ultraviolet radiation.

The structural interlayer which forms a part of the multi-layer sheet material of this invention can be formed of similar materials to those that are used in forming the strippable carrier. A key feature of the structural interlayer is that it is very thin in relation to the thickness of the strippable carrier. Polyesters and especially polyethylene terephthalate are particularly preferred materials. Typically, the mean thickness of the structural interlayer is less than 20 micrometers and preferably is in the range of from about 2 to about 10 micrometers. Preferably, the mean thickness of the strippable carrier is at least five times, and more preferably at least ten times, that of the structural interlayer.

An important function of the structural interlayer is to serve as a support for the abrasion-resistant layer. Layers which have a high degree of abrasion-resistance and scratch-resistance, as is required in the protective laminates of this invention, are typically rather hard and brittle. Hard and brittle layers tend to undergo cracking, whereas a softer material is much less likely to crack but will typically lack scratch- and abrasion-resistance. Therefore, if the abrasion-resistant layer were employed without the contiguous structural interlayer, there would be a significant problem of crack formation in the abrasion-resistant layer during application of the protective laminate to the substrate requiring protection. The structural interlayer provides the tough flexible support that is needed. Additionally, the structural interlayer provides the means by which the protective laminate can be stripped from the surface to be protected and easily reapplied if a defect occurs during lamination.

A thin adhesive layer overlies the structural interlayer and serves to adhesively bond the protective laminate to the substrate. Useful adhesives include pressure-sensitive adhesives and adhesives which are activated by heating, that is, heat-sealable adhesives. Pressure-sensitive adhesives are preferred, and when used, it is necessary to cover the surface of the adhesive layer with a release sheet to enable the multi-layer sheet material to be wound in roll form without adjacent convolutions of the roll sticking together. Suitable materials for use as release sheets with pressure-sensitive adhesive layers are well known in the art. A preferred material for the release sheet is silicone-coated polyethylene terephthalate film.

The abrasion-resistant layer and adhesive layer can both be very thin layers, for example, layers with a thickness in the range of from about 2 to about 10 micrometers. The thickness of the release sheet is only important in minimizing the total diameter of a roll of finished product, since this material is removed and discarded. A preferred thickness is about 25 micrometers.

The sheet materials utilized in forming the protective laminates of this invention, namely, the carrier, the structural interlayer and the release sheet, are preferably materials which exhibit a very high degree of surface smoothness, such as, for example, a surface smoothness in the range of from about 0.01 to about 0.06 micrometers. Additionally, the coating compositions employed, namely the adhesive composition and the composition that is curable to an abrasion-resistant layer, should both be coated in the form of very smooth layers of very uniform thickness. These requirements are, of course, dependent on the nature of the substrate that requires protection and are especially significant when the substrate is a phototool.

In this invention, the protective laminate which serves to protect the substrate is composed solely of the abrasion-resistant layer, the structural interlayer and the adhesive layer, since the strippable carrier and any release sheet which is employed are removed after they have served their purpose. Since each of the abrasion-resistant layer, structural interlayer and adhesive layer is very thin, the combined structure can be very thin. This is, of course, highly advantageous where it is desired to protect a substrate such as a phototool without creating optical distortions.

The materials employed in preparing the multi-layer sheet material of this invention are selected to provide a strong bond between the abrasion-resistant layer and the structural interlayer, since such bond is intended to be permanent. They are selected to provide a weak bond between the carrier and the abrasion-resistant layer, and a weak bond between the adhesive layer and the release sheet, since these bonds are intended to be temporary in view of the fact that both the carrier and the release sheet are eventually stripped off and discarded. Advantageously, it will require less stripping force to remove the release sheet than to remove the carrier since, in use, the release sheet is typically removed first and the carrier is removed only after the laminate has been adhesively bonded to the substrate.

To provide the desired strong bond between the abrasion-resistant layer and the structural interlayer, it is often advantageous to activate the surface of the structural interlayer by a suitable process, such as corona discharge treatment, prior to the step of laminating it to the coated surface of the carrier. Other methods of activating the surface are also well known in the art, including various chemical treatments and flame treatment. A suitable process of flame treatment is described in U.S. Pat. No. 3,072,483, while corona discharge treatment is described in numerous patents, including British patents 971 058 and 1 060 526 and U.S. Pat. Nos. 2,864,755, 3,117,865, 3,220,842, 3,411,910, 3,531,314, 4,298,440 and 4,649,097. Methods of chemical treatment are described in U.S. Pat. Nos. 2,893,896, 3,419,410 and 3,740,252. To provide the desired weak bonding to the carrier and the release sheet, it is often advantageous to coat the surface of each of these materials with a suitable release coating. Useful materials for forming release coatings are well known in the art. An example of a particularly effective release coating is an organosiloxane.

Polymeric subbing layers used to promote the adhesion of hydrophilic coating compositions to polyester film supports are very well known in the photographic art. Useful compositions for this purpose include interpolymers of vinylidene chloride such as vinylidene chloride/acrylonitrile/acrylic acid terpolymers or vinylidene chloride/methyl acrylate/itaconic acid terpolymers. Such compositions are described in numerous patents such as, for example, U.S. Pat. Nos. 2,627,088, 2,698,235, 2,698,240, 2,943,937, 3,143,421, 3,201,249, 3,271,178, 3,443,950 and 3,501,301. The polymeric subbing layer is typically overcoated with a second subbing layer comprised of gelatin which is typically referred to in the art as a "gel sub".

In the present invention, the subbing layers and combinations of subbing layers referred to above can be used as release coatings which will provide the desired weak bonding between the abrasion-resistant layer and the strippable carrier. While these compositions are intended to promote adhesion of hydrophilic layers to polyesters, they do just the opposite in the present invention, in that they reduce the strength of adhesive bonding that would otherwise occur when the hydrophobic radiation-curable composition is cured in contact with the carrier. A suitable thickness for a release coating of this type on the carrier surface is a thickness of about one micrometer.

FIG. 1 is a cross-sectional view of a protective laminate within the scope of this invention. In this embodiment of the invention, a thin abrasion-resistant radiation-cured layer 12 having a thickness of 4 micrometers overlies a thick strippable carrier 10 which is formed of polyethylene terephthalate film having a thickness of 60 micrometers. As indicated by the figure, carrier 10 is releasably bonded to layer 12 and can be stripped away after it has served its purpose. A thin structural interlayer 14, formed of polyethylene terephthalate film having a thickness of 5 micrometers, is interposed between layer 12 and a thin outermost layer 16 composed of a pressure-sensitive adhesive.

Figure 2:
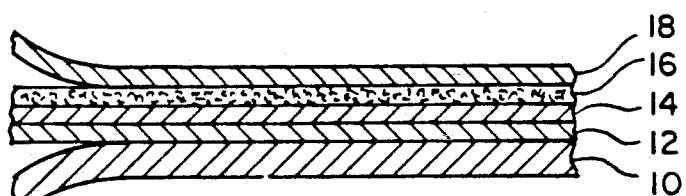
FIG. 2 is a cross-sectional view of the sheet material of FIG. 1 additionally comprising a release sheet over the adhesive layer.

FIG. 2 is a cross-sectional view of a modified form of the laminate of FIG. 1 in which a release sheet 18 overlies adhesive layer 16. As shown in FIG. 2, release sheet 18 is capable of being stripped away, and is ordinarily removed and discarded at the time the protective laminate is applied to a substrate.

Figure 3:
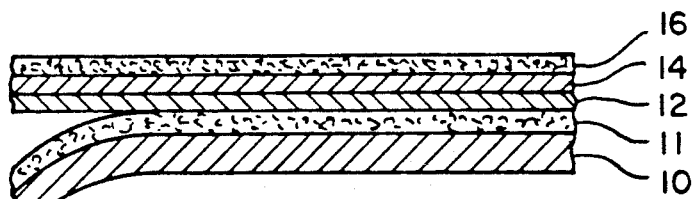
FIG. 3 is a cross-sectional view of the sheet material of FIG. 1 additionally comprising a release coating between the carrier and the abrasion-resistant layer.

FIG. 3 is a cross-sectional view of a modified form of the protective laminate of FIG. 1 in which strippable carrier 10 is provided with a very thin release coating 11, formed of a suitable release material such as an organosiloxane, which facilitates the stripping operation. As indicated by FIG. 3, stripping occurs at the interface between layers 11 and 12.

Figure 4:
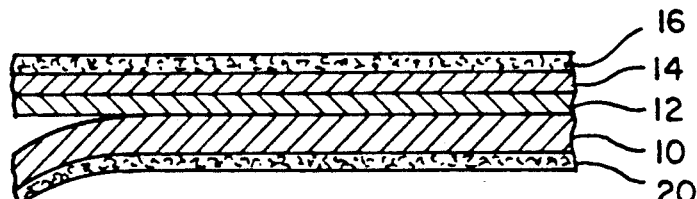
FIG. 4 is a cross-sectional view of the sheet material of FIG. 1 additionally comprising a release coating on the underside of the carrier.

FIG. 4 is a cross-sectional view of a modified form of the protective laminate of FIG. 1 in which the side of strippable carrier 10 opposite to abrasion-resistant layer 12 is coated with a very thin release coating 20 in order to facilitate winding of the protective laminate in roll form.

As explained hereinabove, a key feature of the present invention is a cured-in-place abrasion-resistant layer that is releasably bonded by the curing to the carrier and permanently bonded by the curing to the structural interlayer. The bond between the carrier and the cured abrasion-resistant layer is sufficiently strong to permit the carrying out of the subsequent manufacturing steps, yet is weak enough for the carrier to be easily stripped from the abrasion-resistant layer at the appropriate time.

The curable composition that is used in the method of this invention to form the abrasion-resistant layer by an in situ curing technique can be applied to the strippable carrier by any suitable coating technique that is effective in applying a very thin layer of uniform thickness. For example, the coating step can be carried out by air-knife coating, roll coating, gravure coating, extrusion coating, bead coating, curtain coating, use of wire wound coating rods, and so forth.

In the method of this invention, it is particularly preferred to form the abrasion-resistant layer from a radiation curable coating composition. Such compositions are well known and can be formulated from a very wide range of materials which are curable by radiation to yield a solid cross-linked polymeric matrix. Useful materials of this type can be monomers, oligomers or polymers, or mixtures thereof. While any radiation-curable material which can be successfully coated in the form of a very thin layer can be used, compositions comprising an unsaturated polymer dissolved in a polymerizable monomer are particularly advantageous. It is believed that in these compositions the monomer copolymerizes with the unsaturated polymer to form a cross-linked network. A wide variety of such radiation-curable compositions are known. For example, classes of polymers which are useful for this purpose include epoxy diacrylates, unsaturated polyesters, unsaturated acrylics, unsaturated polybutadienes, unsaturated acrylic modified polyurethanes, unsaturated acrylic modified polythioethers, acrylated glycols and polyols, unsaturated acrylic-terminated polybutadienes and polybutadiene/acrylonitriles, and the like. Specific examples of useful polymers are an epichlorohydrin/bisphenol-A epoxy that is reacted with acrylic acid or methacrylic acid to form acrylate or methacrylate ester end groups at both ends of the epoxy chain, as well as similar polymers prepared from novolac epoxies (fusible and soluble epoxy resins formed by condensation of a phenol with an aldehyde under acid conditions). Further examples of useful polymers are a bisphenol-A/fumaric acid polyesters and a di(hydroxypropyl acrylate-anhydride) modified bisphenol-A/epichlorohydrin epoxy. Oligomers can be used in the radiation-curable composition in place of or in addition to the aforesaid polymers, for example, a polyoxyethylene diacrylate oligomer.

Further examples of polymeric materials useful in radiation-curable compositions which are suitably employed in the method of this invention are described in numerous patents, for example in U.S. Pat. Nos. 3,367,992; 3,551,235; 3,554,886; and 3,558,387.

Particularly preferred radiation-curable compositions for the purpose of this invention are compositions comprising an acrylated epoxy resin. The acrylated epoxy resin are well known materials and resins of this type have been described in numerous patents, for example in U.S. Pat Nos. 3,661,576; 3,673,140; 3,713,864; and 3,772,062 and in British Patent No. 1,375,177. Typical resins of this type are those derived from bisphenols. In a preferred embodiment of this invention, the acrylated epoxy resin is a reaction product of epichlorohydrin, bisphenol-A and an acrylic monomer.

When the acrylated epoxy resin is a liquid of a viscosity suitable for coating, it can be used as the radiation-curable material without the addition thereto of any polymerizable monomer. When the acrylated epoxy resin is a solid, it can be dissolved in a monofunctional acrylic monomer to form a composition suitable for coating. Such monomers can, of course, also be used to dilute the resin and render it less viscous when it is a liquid of too great a viscosity to be easily coated. Typical examples of monofunctional acrylic monomers useful for these purposes are acrylic and methacrylic esters such as ethyl acrylate, butyl acrylate, 2-hydroxypropyl acrylate, cyclohexyl acrylate, 2-ethylhexyl acrylate, methyl methacrylate, ethyl methacrylate, and the like. Polyfunctional acrylates and methacrylates, i.e., those containing at least two acrylic ester groups, can also be advantageously included in the radiation-curable composition to modify such characteristics as curing rate and brittleness of the cured layer. Typical examples of suitable polyfunctional acrylates and methacrylates are neopentylglycol diacrylate, trimethylol propane, triacrylate, 1,6-hexanediol diacrylate, 1,3-propanediol dimethacrylate, 1,3-butylene glycol dimethacrylate, and the like. The radiation-curable composition can also contain other ethylenically unsaturated monomers such as styrene, ethyl vinyl benzene, α-methyl styrene, vinyl acetate, and the like. Mixtures of two or more monofunctional acrylates, of two or more poly-functional acrylates, and of two or more other ethylenically unsaturated monomers can also be used as desired.

In addition to an acrylated epoxy resin, the radiation-curable composition can also contain other resins which serve to modify its properties in a desirable manner, for example it can contain resins which act to improve its adhesive characteristics. The use of such other resins is optional and dependent upon the desired characteristics of the product.

A further example of a preferred class of radiation-curable materials for the purpose of this invention are compositions comprising an acrylated urethane. The acrylated urethanes are well known and commonly used in radiation-curable coatings. Materials of this type are described, for example, in U.S. Pat. Nos. 3,509,234; 3,600,539; 3,694,415; 3,719,638 and 3,775,377 and in British Patent No. 1,321,372. The acrylated urethane resins can be used by themselves or in combination with a different class of resins such as the acrylated epoxy resins.

Apparatus and methods for curing of radiation-curable compositions by subjecting them to suitable forms of radiation are well known and any suitable radiation curing process can be used in carrying out this invention. For example, curing can be carried out by the application of ultraviolet radiation of suitable intensity. High energy ionizing radiation such as X-rays, gamma rays, beta rays, and accelerated electrons can also be used to accomplish curing of the coating. Typically, the radiation used should be of a sufficient intensity to penetrate substantially all the way through the coated layer and will be applied uniformly to the entire surface of the coated layer. The total dosage employed should be sufficient to bring about curing of the radiation-curable composition to form a solid plastic. Typically, dosages in the range of about 0.2 to about 50 megarads, more usually in the range from about 0.5 to about 20 megarads, are employed. The radiation-curable components of the coating composition are, in most cases, completely convertible to a solid product.

When the radiation-curable composition is cured by the use of ultraviolet radiation, a photo-initiator should be included in the composition. Many photoinitiators which are useful for such purpose are known to the art, for example, butyl benzoin ether, isobutyl benzoin ether, ethyl benzoin ether, propyl benzoin ether, benzophenone, benzil ketals, benzoin, acetophenone, dimethyl quinoxiline, 4,4'-bis(dimethylamino)benzophenone, and the like. Such photo-initiators may be used singly or in combination. The use of photoinitiators is not necessary when curing is carried out with high energy electrons.

In a preferred embodiment of this invention, the abrasion-resistant layer is a layer which also exhibits antistatic properties. Among the advantages that this provides is a significant reduction in the tendency to attract dirt during manufacture of the sheet material or during its application to the substrate. Radiation-curable compositions which are capable of forming an abrasion-resistant antistatic layer are well known in the art. An example of a suitable composition for this purpose is that described in Keough, U.S. Pat. No. 4,623,594, issued Nov. 18, 1986, which relates generally to formulations containing a radiation-curable prepolymer and a radiation-reactive antistatic agent which is soluble in the prepolymer.

In a particularly preferred embodiment of this invention, an abrasion-resistant layer which provides antistatic protection is formed by use of a radiation-curable composition comprising a salt dissolved in a mixture of a poly(alkylene glycol) diacrylate and an acrylic monomer containing at least three acrylic ester groups. Such compositions are disclosed in copending commonly assigned U.S. patent application Ser. No. 207,816, filed June 17, 1988 entitled, "Radiation-Curable Composition For Forming An Abrasion-Resistant Antistatic Layer", by Janglin Chen and B. R. Dotson now U.S. Pat. No. 4,957,947. Preferred poly(alkylene glycol)diacrylates are compounds of the formula:

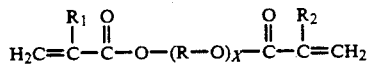

wherein R is an alkylene radical of 2 to 4 carbon atoms, $R_1$ and $R_2$ are independently H or $CH_3$, an x is an integer having a value of from 3 to 50. Particularly preferred poly(alkylene glycol)diacrylates are the poly(ethylene glycol)diacrylates of the formula:

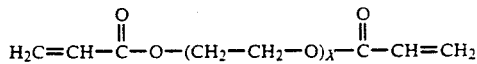

wherein x is an integer having a value of from 5 to 20. The acrylic monomer containing at least three acrylic ester groups, for example, a triacrylate, tetraacrylate or pentaacrylate, serves to provide enhanced scratch- and abrasion-resistance. Preferred monomers of this type are acrylated pentaerythritols and especially dipentaerythritol monohydroxy pentaacrylate. The salt is preferably an alkali metal salt, and especially an alkali metal fluoroborate. Examples of useful salts include $LiBF_4$, $NaBF_4$, $KBF_4$, $Zn(BF_4)_2$, $KCF_3SO_3$, $NaCF_3SO_3$, $LiCF_3SO_3$, $KCF_3CO_2$, $LiCF_3CO_2$, $NaC_3F_7CO_2$, $LiI$, $NaI$, $KI$, $KC_4F_9SO_3$, $KPF_6$, $NaB(C_6H_5)_4$, $LiClO_4$, $KSCN$, $LiSCN$, $NaSCN$, and the like. Typically, the radiation-curable composition contains about 2 to about 20% by weight of the salt, about 15 to about 70% by weight of the poly(alkylene glycol)diacrylate and about 20 to about 80% by weight of the acrylic monomer containing at least three acrylic ester groups.

In the method of this invention, the curable composition serves several functions. In particular, it serves to form a protective layer which is scratch- and abrasion-resistant to a greater extent than can be achieved without the use of an in situ curing technique, since such cured layers typically exhibit superior scratch- and abrasion-resistance compared to cast or extruded films. It also serves, in effect, as a laminating adhesive in the manufacturing process to temporarily bond the structural interlayer to the strippable carrier. In preferred embodiments of the invention, it serves the additional purpose of providing antistatic protection. Use of the cured-in-place process of this invention to form the abrasion-resistant layer has the further advantage that it avoids the need to dry a liquid layer whose surface is exposed while it passes through a drying oven and thus avoids the risk of contamination that can occur in such a drying process.

The adhesive composition can be applied to the structural interlayer by any suitable coating technique such as the coating methods described above in reference to the coating of the radiation-curable composition. Acrylate adhesives which are normally tacky and pressure-sensitive are preferred.

Any suitable technique can be used to bring the protective laminate into conforming contact with the substrate requiring protection. In instances where the substrate is a phototool, great care should be exercised to see that no entrapment of dirt or air bubbles occurs. If an error in alignment or other problem such as formation of a wrinkle occurs in this step, the protective laminate can be stripped off, re-positioned and re-applied. The strippable carrier is ordinarily retained to provide protection until such time as the phototool is put in use.

The essential steps of the manufacturing process are to coat the curable liquid composition on one surface of the carrier; to laminate the structural interlayer to the wet coated surface; to cure by suitable means such as by exposure to radiation through either the carrier or the interlayer or both; to coat the surface of the structural interlayer with a layer of adhesive; to apply a release sheet when required; and, under typical conditions, to wind in roll form.

The multi-layer sheet material of this invention is adaptable to use in either web form or sheet form, as dictated by the requirements of the particular end use. It is also adaptable to providing a variety of types of protective surface. For example, a very smooth surface can be achieved by having the curable liquid replicate the surface of a very smooth strippable carrier. Alternatively, where a matte finish is desired, as is sometimes the case with color prints, the strippable carrier can be textured to impart a similar textured surface to the abrasion-resistant layer. The protective laminate can be applied to one or both faces of a photographic element, for example, it can be applied over the emulsion layers as a protective overcoat and also on the back side of the film support to protect it from scratch and abrasion damage.

The invention is further illustrated by the following example of its practice.

A radiation-curable coating composition is prepared as follows:

| Component | Weight % |
| --- | --- |
| PEG (400) DA* | 54.5 |
| DPEMHPA** | 28.3 |
| LiCF$_3$SO$_3$ | 11.5 |
| Hydroxy cyclohexyl phenyl ketone*** | 5.7 |
| | 100.0 |

*Poly(ethylene glycol)diacrylate with a molecular weight of approximately 400.
**Dipentaerythritol monohydroxy pentaacrylate.
***A photoinitiator of the benzil ketal class available from Ciba-Geigy Corporation under the trademark IRGACURE 184.

To form a strippable carrier, a sheet of polyethylene terephthalate film with a thickness of 63.5 micrometers is coated with both a polymeric sub (vinylidene chloride/methyl acrylate/itaconic acid terpolymer) and a gel sub, as described in U.S. Pat. No. 3,271,178. The subbed surface of the carrier exhibits a nominal surface roughness of 0.014 micrometers Root Mean Square and a release value of approximately 4 grams/lineal centimeter when peeled at a rate of 200 mm/min from an abrasion-resistant layer formed from the above-described radiation-curable coating composition.

The radiation-curable coating composition, which exhibits a Brookfield viscosity of approximately 160 centipoises, is applied as a thin coating to the subbed surface of the strippable carrier. A suitable coating technique is to employ a reverse gravure coating process with a trihelical patterned gravure cylinder having an engraved volume of approximately 9.5 cc/m$^2$.

A polyethylene terephthate film with a thickness of 5 micrometers, for example DuPont's MYLAR film Type C, 24 gauge, is suitable for use as the structural interlayer. Corona discharge treatment (approximately 0.8 joules/cm$^2$) of the surface of this film prior to the wet-lamination step provides an adequate level of adhesion to the abrasion-resistant layer.

The corona-discharge-treated surface of the structural interlayer is wet-laminated to the liquid-coated surface of the carrier using a steel roll and an 80 durometer (Shore A) backing roll at a pressure of approximately 0.4 Kg/lineal centimeter.

Curing of the layer of radiation-curable coating composition is accomplished by the use of ultraviolet radiation directed through the structural interlayer. Medium pressure mercury lamps which emit radiation in the 200–400 nanometer portion of the spectrum are suitable for this purpose. Curing conditions are adjusted to provide an exposure level of 0.5–1.0 joules/cm$^2$. The cured layer exhibits excellent scratch- and abrasion-resistance and additionally provides effective antistatic protection.

After curing of the radiation-curable composition is complete, a thin layer of adhesive is applied to the surface of the structural interlayer. A suitable adhesive for this purpose is an acrylic-resin-based pressure-sensitive adhesive available from Monsanto as GELVA Multipolymer Solution 1753. This adhesive is supplied at a nominal concentration of 31% solids in a solvent blend composed of 56 weight % ethyl acetate, 27 weight % isopropanol, 10 weight % hexane and 7 weight % ethanol. To provide the very thin coatings required in this invention, the adhesive solution is further diluted to 8–12% solids using a dilution solvent blend composed of 55 weight % ethyl acetate, 35 weight % isopropanol and 10 weight % heptane. The resulting solution has a specific gravity of approximately 0.89 and a Brookfield viscosity of less than 200 centipoises.

The adhesive is coated directly on the surface of the structural interlayer without any prior treatment of the surface. The adhesive is coated with a fixed-slot hopper to provide a dry coverage of 2.2–8.6 grams/m$^2$ (preferably 4.3 g/m$^2$). These coverages are roughly equivalent to thicknesses of 2–8 micrometers (preferably 4 micrometers). The level of adhesion, or degree of peelability, is directly related to the dry adhesive coverage and 4.3±1.0 g/m$^2$ provides optimum results. The conditions under which the adhesive is dried should be such that less than one percent total residual solvent remains in the coating prior to application of the release sheet. The minimum time and temperature required to achieve this level of dryness is one minute at 70° C.

After the adhesive has been dried, a release sheet is applied to enable the laminate material to be wound in roll form. A suitable release sheet is POLYSLIK 2002 film, which is available from H. P. Smith Paper Company, a subsidiary of Phillips Petroleum Company. This material is a 25 micrometer thick polyester film with a silicone release coating on one surface. The release surface of this film exhibits a nominal surface roughness of 0.036 micrometers Root Mean Square and a release value of approximately 3 grams/lineal centimeter when peeled at a rate of 200 mm/min from the aforesaid adhesive layer.

In utilizing this invention, a laminate as described above is bonded to the substrate requiring protection by means of the adhesive coating and, after ensuring that the laminate is correctly positioned, the strippable carrier is removed to thereby expose the abrasion-resistant layer.

As hereinabove described, a very important feature of the protective laminate of this invention is that the strippable carrier is relatively thick, while the structural interlayer is very thin. Many significant advantages accrue from this relationship of layer thickness in the multi-layer sheet material of this invention. Thus, for example, the thick carrier is easy to convey and handle in the manufacturing process, whereas a very thin sheet material is difficult to convey and handle without wrinkling, distortion or other damage. After the curable liquid composition is coated on the carrier, the thin structural interlayer is laminated to it by suitable laminating means, such as pressure rollers, and an in situ curing step is then carried out. Thereafter, an adhesive layer is applied over the structural interlayer. Thus, it is not necessary to convey the interlayer through a coating station until after it has been laminated to the carrier, so the severe problems of thin web conveyance and handling over multiple spans that would ordinarily be involved with such materials are effectively avoided. Moreover, the multi-layer sheet material of this invention not only has advantages in ease of manufacture, but also in ease of use. Thus, it is sufficiently thick and strong when the carrier is present to make it easy to adhesively bond it to the substrate in a very smooth and wrinkle free state, yet it has the important advantage that it is very thin after the carrier is removed.

To utilize a very thin protective laminate without employing a strippable carrier, as is done, for example, in U.S. Pat. No. 4,077,830, it is necessary to maintain the laminate under tension while applying it to the phototool so as to avoid the formation of wrinkles. This is a critical and difficult step. If not enough tension is applied, wrinkles will form; but if too much tension is applied, there is a tendency for excessive curling of the phototool to occur. To exactly control the tension adds greatly to the difficulty of the process. With the thick strippable carrier that is utilized in the present invention, the lamination step can be easily carried out, without the need for critical control of tension and nip forces, and there is no problem of either wrinkling of the protective laminate or curl of the substrate.

Use of the laminates of this invention to provide protective surfaces for substrates requiring abrasion and scratch protection is especially advantageous in the photographic field. Thus, it has been proposed in the past to apply a radiation-curable liquid composition over the surface of a processed photographic product, such as a motion picture film, and to cure such liquid coating to a solid layer which is scratch- and abrasion-resistant by exposing it to a suitable source of high energy radiation. (See, for example, U.S. Pat. Nos. 4,092,173, 4,171,979, 4,333,998 and 4,426,431). However, this requires that photofinishers must carry out the application and curing of the radiation-curable liquid even though they typically do not have personnel who are experienced in coating and curing technology. This lack of experience can result in inconsistent quality and a high level of waste. In addition, radiation-curable formulations in the liquid state pose a concern from a health and safety standpoint, as does the radiation-curing equipment. Such concerns are obviated by the present invention in that the photofinishing laboratory merely needs to carry out a simple laminating operation using a multi-layer sheet material that poses no health or safety concerns, yet the advantages of radiation-curable formulations with respect to excellent scratch- and abrasion-resistant properties are still achieved.

The invention has been described in detail with particular reference to preferred embodiments thereof, but it will be understood that variations and modifications can be effected within the spirit and scope of the invention.

What is claimed is:

1. A multi-layer sheet material that is useful as a protective laminate; said multi-layer sheet material consisting essentially of:
   (1) a strippable carrier comprised of a flexible sheet material;
   (2) an abrasion-resistant layer which overlies said carrier and is releasably boned thereto, said abrasion-resistant layer having been cured by in situ radiation-curing;
   (3) a thin structural interlayer of flexible laminatable sheet material which overlies said abrasion-resistant layer and is permanently bonded thereto, as a result of said in situ radiation-curing of said abrasion-resistant layer, said interlayer being very thin in relation to the thickness of said carrier;
   and (4) an adhesive layer overlying said interlayer; said multi-layer sheet material being adapted to be bonded to a substrate by means of said adhesive layer and said carrier being adapted to be stripped from said abrasion-resistant layer to thereby provide a protective laminate on said substrate which has an abrasion-resistant surface.

2. A multi-layer sheet material as claimed in claim 1 additionally comprising a release sheet overlying said adhesive layer.

3. A multi-layer sheet material as claimed in claim 1 additionally comprising a release coating on the side of said carrier opposite to said abrasion-resistant coating.

4. A multi-layer sheet material as claimed in claim 1 additionally comprising a release coating interposed between said carrier and said abrasion-resistant layer.

5. A multi-layer sheet material as claimed in claim 1 wherein said interlayer has a mean thickness of less than 20 micrometers and said carrier has a mean thickness at least five times that of said interlayer.

6. A multi-layer sheet material as claimed in claim 1 wherein said interlayer has a mean thickness in the range of about 2 to about 10 micrometers, and said carrier has a mean thickness in the range of about 50 to about 175 micrometers.

7. A multi-layer sheet material as claimed in claim 1 wherein said adhesive layer is composed of a pressure-sensitive adhesive.

8. A multi-layer sheet material as claimed in claim 1 wherein said adhesive layer is composed of a heat-sealable adhesive.

9. A multi-layer sheet material as claimed in claim 1 wherein said interlayer is composed of polyethylene terephthalate.

10. A multi-layer sheet material as claimed in claim 1 wherein both said interlayer and said carrier are composed of polyethylene terephthalate.

11. A multi-layer sheet material as claimed in claim 1 wherein said abrasion-resistant layer is also an antistatic layer.

12. A multi-layer sheet material that is useful as a protective laminate, said multi-layer sheet material comprising:
   (1) a strippable carrier of polyethylene terephthalate having a mean thickness in the range of from about 50 to about 175 micrometers;
   (2) a radiation-cured abrasion-resistant layer which overlies said carrier and is releasably bonded thereto;
   (3) a structural interlayer of polyethylene terephthalate having a mean thickness in the range of from about 2 to about 10 micrometers which overlies said abrasion-resistant layer and is permanently bonded thereto;
   (4) a layer of pressure-sensitive adhesive overlying said interlayer;
   and (5) a release sheet overlying said adhesive layer; said multi-layer sheet material being adapted to be bonded to a substrate by means of said adhesive layer upon removal of said release sheet and said carrier being adapted to be stripped from said abrasion-resistant layer to thereby provide a protective laminate on said substrate which has an abrasion-resistant surface.

* * * * *